United States Patent
Hosoda et al.

(10) Patent No.: US 6,746,762 B1
(45) Date of Patent: Jun. 8, 2004

(54) FILM SELECTIVELY PERMEABLE TO CARBON DIOXIDE GAS AND FOOD PACKAGING FILM COMPRISING THE SAME

(75) Inventors: Tomonori Hosoda, Ibaraki (JP); Hiroyuki Oba, Ibaraki (JP); Toru Saika, Ibaraki (JP); Katsumi Kawaguchi, Ibaraki (JP)

(73) Assignee: Kureha Chemical Industry Co., Ltd., Tokyo (JP)

(*) Notice: Subject to any disclaimer, the term of this patent is extended or adjusted under 35 U.S.C. 154(b) by 8 days.

(21) Appl. No.: 10/111,374

(22) PCT Filed: Nov. 10, 2000

(86) PCT No.: PCT/JP00/07965

§ 371 (c)(1),
(2), (4) Date: Jul. 1, 2002

(87) PCT Pub. No.: WO01/36519

PCT Pub. Date: May 25, 2001

(30) Foreign Application Priority Data

Nov. 12, 1999 (JP) ............................. 11-323293

(51) Int. Cl.⁷ ................................. B32B 23/04
(52) U.S. Cl. .................. 428/332; 428/337; 428/532
(58) Field of Search ................. 428/332, 337, 428/532

(56) References Cited

U.S. PATENT DOCUMENTS 5,658,622 A    8/1997   Berlin et al. ............... 428/34.2
5,962,663 A   10/1999   Wachter et al. ............. 536/20

FOREIGN PATENT DOCUMENTS

| EP | 0 369 787   |        | 5/1990  |
|----|-------------|--------|---------|
| EP | 649870      | A1     | 4/1995  |
| JP | 1-308780    | A      | 12/1989 |
| JP | 5-74        | A      | 1/1993  |
| JP | 5-293343    | A      | 11/1993 |
| JP | 7-112769    | A      | 5/1995  |
| JP | 7-132045    | A      | 5/1995  |
| JP | 8-332022    | A      | 12/1996 |

OTHER PUBLICATIONS

Sen–I Gakkaishi, vol. 39, No. 11, Nov. 10, 1983, Shadan Jojin Seni Gakkai, Sakurai, Kensuke; Fujimoto, Junichi; Shibano, Tokiyoshi; Takahashi, Toshisada, "Gas permeation through chitosan membranes", pp. 493–495.

Database WPI, 1990 & Abstract SU 1 504 237, Aug. 30, 1989.

Primary Examiner—Monique R. Jackson
(74) Attorney, Agent, or Firm—Nixon & Vanderhye, PC

(57) ABSTRACT

A film selectively permeable to carbon dioxide gas which includes chitosan having a degree of deacetylation of 70 mol % or higher and in which the ratio of the carbon dioxide gas transmission ($CO_2TR$) to the oxygen gas transmission ($O_2TR$), ($CO_2TR/O_2TR$), is 15 or higher and a food packaging film made from such a film. The films are insoluble in water, are highly safe from the standpoint of food hygiene, and have such selective gas permeability that the ratio of carbon dioxide gas transmission to oxygen gas transmission is high, which can be economically obtained.

4 Claims, No Drawings

FILM SELECTIVELY PERMEABLE TO CARBON DIOXIDE GAS AND FOOD PACKAGING FILM COMPRISING THE SAME

This application is the US national phase of international application PCT/JP00/07965 filed Nov. 10, 2000 which designated the U.S.

TECHNICAL FIELD

The present invention relates to a film selectively permeable to carbon dioxide gas derived from a specified natural raw material and to a food packaging film comprising the same. More particularly, the present invention relates to a film selectively permeable to carbon dioxide gas which comprises chitosan that is basic polysaccharide and in which the ratio of the carbon dioxide gas transmission ($CO_2TR$) to the oxygen gas transmission ($O_2TR$), ($CO_2TR/O_2TR$), is high, is highly safe from the standpoint of food hygiene, is insoluble in water, and is suitable for packaging fermented foods and vegetables, cut flowers and the like, and to a food packaging film comprising the same.

BACKGROUND ART

In the field of food packaging, technologies related to films that are selectively permeable to carbon dioxide gas include, for example, a molded article for packaging food, which comprises a composition composed of a polyvinyl alcohol resin and at least one compound which is selected from the group consisting of an alkylene glycol monomer, a hydroxy acid monomer and polymers thereof and which has a ratio of the solubility of carbon dioxide to the solubility of oxygen gas being 30 or more as disclosed in JP-A-5-222215. This publication describes that the films obtained from the molded article are suitable for packaging those foods which generate much carbon dioxide gas, and disfavor contact of oxygen, for example, cheese products, coffee beans and so forth. JP-A-9-316208 describes that a film obtained by heat-treatment of a reaction mixture of a polyacrylic acid and an aliphatic diamine has a resistance to water and has a ratio of the permeability to carbon dioxide gas to the permeability to oxygen gas of 15 or higher. Further, JP-A-11-538 describes that a film that comprises a polymer having a polyamine structure has a high ratio of the carbon dioxide gas transmission to the oxygen gas transmission.

For such a material having selective gas permeability, a progress has been made in the development of applications in particular as food packaging materials, and there have been demanded packaging materials in view of satisfying the safety from the standpoint of food hygiene.

An object of the present invention is to provide in an economical way a film which is insoluble in water, is highly safe from the standpoint of food hygiene, and has such selective gas permeability that the ratio of the carbon dioxide gas transmission to the oxygen gas transmission is high.

DISCLOSURE OF THE INVENTION

The inventors of the present invention have found that a film, which comprises a specified chitosan, has a high ratio of the carbon dioxide gas transmission to the oxygen gas transmission and can solve such problems, thus achieving the present invention.

Therefore, the present invention provides a film selectively permeable to carbon dioxide gas, which comprises a chitosan having a degree of deacetylation of 70 mol % or higher and in which the ratio of the carbon dioxide gas transmission ($CO_2TR$) to the oxygen gas transmission ($O_2TR$), ($CO_2TR/O_2TR$), is 15 or higher. The present invention provides a film selectively permeable to carbon dioxide gas comprising a laminate film including at least three layers composed of an outer layer, an intermediate layer and an inner layer, in which the outer layer and the inner layer comprise a thermoplastic resin and the intermediate layer comprises a film according to the above-mentioned invention, and in which the ratio ($CO_2TR/O_2TR$) as the laminate film is 10 or higher. Further, the present invention provides a film selectively permeable to carbon dioxide gas according to the above-mentioned invention, in which the film composed of chitosan in the intermediate layer has a thickness of 0.2 to 50 μm. Further, the present invention provides a food packaging film which comprises a film selectively permeable to carbon dioxide gas according to the above-mentioned invention, in which the food is coffee, cheeses, bean pastes, pickles, root crops, mushrooms, leaf-stem crops, fruit vegetables, or fruits.

BEST MODE FOR CARRYING OUT THE INVENTION

Chitosan can be obtained by deacetylating chitin, which exists widely in nature, for example, as a component constituting shells of lobsters and crabs, in a concentrated alkali. Fully deacetylated chitin is a basic polysaccharide having two hydroxyl groups and one amino group in the constitutional unit molecule thereof. Free chitosan does not dissolve in water and organic solvents but forms a salt in the presence of an inorganic acid such as hydrochloric acid or organic acid such as acetic acid, propionic acid, oxalic acid, butyric acid, lactic acid, tartaric acid, succinic acid, or citric acid to give an acid salt solution. As for the chitosan used in the present invention, one that has a molecular weight of 10,000 to 1,000,000, and further 10,000 to 500,000 and a viscosity of 1 to 20,000 cp (1 to 20,000 mPa·s), and further 1 to 2,000 cp (1 to 2,000 mPa·s) is preferred in consideration of coating properties as shown in the examples described hereinbelow. The degree of deacetylation of chitosan is 70 mol % or higher, preferably 80 mol % or higher. It is desirable that the viscosity of chitosan is 3 to 2,000 cP (3 to 2,000 mPa·s) for preparing solutions. Note that chitosan having a degree of deacetylation of below 70 mol % obtained by treating chitin in a concentrated alkali does not dissolve in acetic acid and cannot form films.

When using chitosan, it is handled in the form of the aforementioned chitosan acid salt solutions in consideration of ease of handling. Among these, acetic acid salt and lactic acid salt are preferred in consideration of price and safety of foods. In the chitosan acid salt solutions, hydrophilic organic solvents, for example, alcohols such as methanol, ethanol and isopropanol and ketones may be used as diluents. Further, when coating a chitosan acid salt solution on a substrate, in cases where the chitosan acid salt solution is difficult to coat on the surface of the substrate and thus being repelled, use of the diluent or of a small amount of surfactant will make the coating easy.

To obtain a film selectively permeable to carbon dioxide gas comprising chitosan according to the present invention, the above-mentioned chitosan acid salt solution is coated on a substrate in the form of a film, sheet, plate or the like and is dried (for example, at 30 to 150° C., for 1 second to 30 hours) together with the substrate film to obtain a dry coating of chitosan acid salt. That is, the film is molded by a solvent casting method in which a chitosan acid salt solution is cast on a support (substrate) such as a metal plate, a glass plate or a plastic film and dried to form a coating, an extrusion method in which an aqueous chitosan acid salt solution of a high concentration is cast through a small slit of an extruder in the form of a film under a discharge pressure and the wet film is dried on a rotary drum or a belt, a method in which after coating the aqueous solution on a plastic film, the coated film is dried by heating or the like method. In this way, a dry chitosan acid salt coating is obtained. Of those film-forming methods, in particular, the solvent casting method (casting method, coating method) is preferably used since molded films (dry coatings) having excellent transparency can be easily obtained.

The chitosan acid salt coating is water-soluble. A film comprising water-insoluble chitosan is obtained by treating the dry coating with an alkaline aqueous solution, for example dipping it in an aqueous sodium hydroxide solution (for example, dipping it in an aqueous 1 N sodium hydroxide solution for 0.5 seconds to 48 hours), and then washing it with water (for example, in tap water for 1 second to 1 hour) to obtain a film made of chitosan which is insoluble in water. By drying this film (for example, at 30 to 200° C. for 0.5 seconds to 1 hour), the film of the present invention can be obtained.

Here, to obtain a chitosan acid salt solution, 0.1 to 10 mass parts, preferably 0.2 to 5 mass parts, of an acid, for example, acetic acid, and 5 to 1,000 mass parts of a solvent may be mixed with 1 mass part of chitosan to dissolve chitosan for preparing it. Note that water is preferred as the solvent. A mixed solution of water and an organic solvent that is soluble in the water (for example, 2-propanol, ethanol or the like) may also be used as far as the chitosan is dissolved therein. In a case where the chitosan acid salt coating is converted back into a chitosan coating, the chitosan acid salt film is dipped in, for example, an aqueous 1 N sodium hydroxide solution at 5 to 60° C. for 0.5 seconds to 48 hours. The chitosan coating (film) thus obtained is peeled from the substrate and can be used alone as a chitosan film. The film of chitosan alone is a film selectively permeable to carbon dioxide gas in which the ratio of the carbon dioxide gas transmission ($CO_2TR$) to the oxygen gas transmission ($O_2TR$), ($CO_2TR/O_2TR$), is 15 or higher, more preferably 17 or higher. Its oxygen gas transmission under the conditions of 23° C. and 80% RH is preferably 0.1 to 2,000 ($cm^3/m^2 \cdot day \cdot atm$) (0.987 to $19.74 \times 10^3$ $cm^3/m^2 \cdot day \cdot MPa$), more preferably 0.1 to 1,000 ($cm^3/m^2 \cdot day \cdot atm$) (0.987 to $9.87 \times 10^3$ $cm^3/m^2 \cdot day \cdot MPa$). Its carbon dioxide gas transmission under the conditions of 23° C. and 80% RH is preferably 3 to 60,000 ($cm^3/m^2 \cdot day \cdot atm$) (29.6 to $5.922 \times 10^5$ $cm^3/m^2 \cdot day \cdot MPa$), more preferably 3 to 30,000 ($cm^3/m^2 \cdot day \cdot atm$) (29.61 to $29.6 \times 10^4$ $cm^3/m^2 \cdot day \cdot MPa$). When using a film of chitosan singly, the film thickness is preferably 3 to 500 μm, more preferably 10 to 400 μm. Furthermore, by adjusting the thickness of chitosan film, its ($CO_2TR$) may be set in the aforementioned range of 3 to 60,000 ($cm^3/m^2 \cdot day \cdot atm$) (29.61 to $5.922 \times 10^5$ $cm^3/m^2 \cdot day \cdot MPa$).

As for the substrate as a support used for producing a film composed of chitosan alone or a film used together with a substrate layer, at least one material selected from a film comprising a thermoplastic resin, a film comprising a thermosetting resin, paper, fabric, nonwoven fabric, metal porous material and an inorganic sintered porous material may be used. The substrate layer may be selected as appropriate in consideration of its application purpose, the fact that the gas transmission of the substrate layer should not extremely inhibit selective carbon dioxide gas permeability of the laminate film, and so on.

The raw material of a film comprising a thermoplastic resin is not particularly limited and includes, for example, polyester, polyolefin, polystyrene, polyvinyl chloride, polyvinylidene chloride, polyamide, polyvinylidene fluoride (PVDF), polytetrafluoroethylene, etc., and preferably polyester, polyvinylidene fluoride, polyolefin and polyamide. The polyester includes polyethylene terephthalate (PET), polyethylene isophthalate, polybutylene terephthalate, poly(1,4-cyclohexylenedimethylene terephthalate), polyethylene 2,6-naphthalenedicarboxylate, etc., and copolymers and blends of these with each other, or blends of these with small amounts of other resins and so on.

The polyolefin includes homopolymers or copolymers of olefins, copolymers of olefins with other copolymerizable monomers, for example, vinyl-based monomers and modified polymers of these. Specific examples thereof include high density polyethylene, low density polyethylene (hereinafter, abbreviated as "LDPE"), linear low density polyethylene (hereinafter, abbreviated as "LLDPE"), linear very low density polyethylene (hereinafter, abbreviated as "VLDPE"), ethylene/α-olefin copolymers using a single site catalyst (for example, ssc-VLDPE, ssc-LLDPE, etc.), polypropylene, ethylene/propylene copolymer, poly(4-methylpentene-1) (hereinafter, abbreviated as "PMP"), ionomer resin, ethylene/vinyl acetate copolymer (hereinafter, abbreviated as "EVA"), etylene/acrylic acid copolymer, ethylene/methacrylic acid copolymer (hereinafter, abbreviated as "EMAA"), ethylene/methyl acrylate copolymer, ethylene/methyl methacrylate copolymer, modified polyolefin (for example, reaction products between homopolymers or copolymers of olefins and unsaturated carboxylic acid such as maleic acid or fumaric acid or acid anhydride or ester or metal salt thereof) and so on. The above-mentioned polyolefin may be used singly or two or more of them may be used in admixture. They may be stretched or unstretched. Among these, PMP, VLDPE, EVA, EMAA, LLDPE, ethylene/acrylic acid copolymer and the like are preferable in consideration of physical property of the obtained laminate.

As one preferred embodiment of the present invention, there is provided an invention of a film selectively permeable to carbon dioxide gas, which consists of a laminate film including at least three layers composed of an outer layer, an intermediate layer and an inner layer, in which the outer layer and the inner layer include a thermoplastic resin and the intermediate layer includes a film made of chitosan, and in which the ($CO_2TR/O_2TR$) as the laminate film is 10 or higher.

In a laminate film in which the intermediate layer includes the film made of chitosan, the aforementioned substrate may be used as it is as the material for constituting the outer layer and the inner layer.

The substrate may be used as a support when chitosan is used alone or when chitosan is used together with the substrate. However, it may be used by itself as an outer layer or as an inner layer of the laminate. When it is used as a laminate film, it is preferable that the outer layer and the inner layer of the laminate film comprise a thermoplastic resin. For example, in the case of a laminate obtained by coating chitosan acid salt on a PMP film as a substrate and converting it back to chitosan with an alkali, the PMP film layer constitutes the outer layer or the inner layer of the laminate. For example, by sticking a stretched polyethylene film separately provided having coated on the surface thereof an adhesive and the previously obtained laminate film to each other so that the adhesive side of the stretched polyethylene film and the chitosan side of the laminate film can contact to each other, a laminate film of PMP layer/ chitosan layer/adhesive layer/stretched polyethylene layer is obtained. When particularly strong adhesion is necessary between the PMP layer and the chitosan layer, an adhesive is coated on the PMP film and a chitosan acid salt solution is coated thereon, followed by alkali treatment to convert the chitosan acid salt solution to chitosan, and then the aforementioned stretched polyethylene film is applied on its adhesive side to obtain a laminate film of PMP layer/ adhesive layer/chitosan layer/adhesive layer/stretched polyethylene layer. In the present invention, it is preferable that the intermediate layer is a laminate film including the aforementioned chitosan film layer and the thickness of the chitosan layer is 0.2 to 50 μm, more preferably 0.5 to 20 μm. In some cases, either outer layer or inner layer may be provided with at least one layer selected from paper, fabric, nonwoven fabric, polyolefin-based nonwoven fabric, porous polyolefin layer, porous polyester layer, and porous polyamide layer for the purpose of reinforcement.

For the inner layer (the layer contacting the object to be packaged) of a laminate film, it is preferable that a heat sealable, high frequency sealable, or supersonic sealable material (sealant) be used in consideration of a case where films are to be heat-bonded when bags and the like are produced from the laminate. The heat sealable resin includes, for example, polyolefins such as low density polyethylene, linear low density polyethylene, high density polyethylene, ethylene/vinyl acetate copolymer, ethylene-based copolymer obtained by using a metallocene catalyst, propylene-based copolymer obtained by using a metallocene catalyst, unstretched polypropylene, ethylene/acrylic acid copolymer, ethylene/acrylic acid salt copolymer, and ethylene/ethyl acrylate copolymer, nylon copolymers such as a nylon 6·66 copolymer and a nylon 6·12 copolymer, and the like. The high frequency sealable resin includes polyvinyl chloride, polyvinylidene chloride, a nylon 6, a nylon 66 and the like. The materials of the outer and inner layer may be the same or different.

Although the thickness of respective layers of the laminate film is not particularly limited except for the thickness of the chitosan film that is included in the intermediate layer, it is preferable that the laminate film as a whole has a thickness of 30 to 500 μm, more preferably 50 to 200 μm. Furthermore, in a case where the inner layer is used as a seal layer, it is preferable that the thickness of the inner layer is 10 to 100 μm, more preferably 15 to 80 μm in consideration of the seal strength and gas transmission.

The laminate film of the present invention has oxygen gas transmission at 23° C. at 80% RH of preferably 10 to 5,000 ($cm^3/m^2 \cdot day \cdot atm$) (98.7 to $49.35 \times 10^3$ $cm^3/m^2 \cdot day \cdot MPa$), more preferably 20 to 3,000 ($cm^3/m^2 \cdot day \cdot atm$) (197.4 to $29.61 \times 10^3$ $cm^3/m^2 \cdot day \cdot MPa$). Its carbon dioxide gas transmission under the conditions of 23° C. and 80% RH is preferably 300 to 150,000 ($cm^3/m^2 \cdot day \cdot atm$) ($29.6 \times 10^2$ to $14.9 \times 10^5$ $cm^3/m^2 \cdot day \cdot MPa$), more preferably 600 to 90,000 ($cm^3/m^2 \cdot day \cdot atm$) ($59.22 \times 10^2$ to $88.83 \times 10^4$ $cm^3/m^2 \cdot day \cdot MPa$). The ratio ($CO_2TR/O_2TR$) as the laminate film is 10 or higher, preferably 12 or higher.

The water vapor transmission rate at 40° C. at 90% RH is preferably 1 to 100 $g/m^2 \cdot day$, more preferably 1 to 30 $g/m^2 \cdot day$ from the viewpoint of prevention of discoloration and weight loss of foods.

Since the chitosan film of the present invention alone or a laminate film including the chitosan film of the present invention as an intermediate layer has a ratio ($CO_2TR/O_2TR$) of 10 or higher, it is effective to use the film for packaging foods which tend to generate carbon dioxide gas and to which oxygen is harmful. Foods are not particularly limited as far as they have the above-mentioned properties, namely, tendency to generate carbon dioxide gas and harmfulness of oxygen gas thereto, and the foods include coffee, cheeses, bean pastes, pickles, root crops, mushrooms, leafstem crops, fruit vegetables, fruits and the like.

The coffee includes bean-like and pulverized-like ones before or after roasting. The cheeses include, for example, natural cheeses such as Emmenthaler, Cheddar, Gruyere, and Gouda, or process cheeses containing these. The bean pastes include, for example, white bean paste, red bean paste, raw bean paste, etc., and in particular bean paste in products in which fermentation continuously proceeds and the like. The pickles include, for example, brine pickles of scallion, ginger, pickled plum, Chinese cabbage, etc., pickles in sake lees such as narazuke pickles and wasabi (Japanese horseradish) pickles, koji pickles such as bettarazuke pickles, bean paste pickles such as wild vegetables and radish, vinegar pickles such as senmaizuke (turnip pickles), mustard pickles such as eggplant mustard pickles, mash pickles such as cucumber pickles, and fermented pickles such as kimchee. The root crops include, for example, yam, yamato potato, lotus root, potato, ginger, burdock, taro, etc. The mushrooms include shiitake, nameko, enokitake, shimeji, mushroom, bean sprouts, etc. The leaf-stem crops include, for example, spinach, asparagus, garlic, cabbage, Chinese cabbage, lettuce, scallion, cauliflower, etc. The fruit vegetables include, for example, green soybeans and field peas. The fruits include, for example, orange, apple, grape, peach, pear, persimmon, plum, chestnut, almond, etc. In addition, cut flowers may also be included.

Food packaging films comprising the film selectively permeable to carbon dioxide gas according to the present invention can be used in ripening and storage upon manufacture or production of these foods, storage of products in the process of their distribution, and exhibition etc. as necessary to obtain objective packages.

EXAMPLES

Hereinafter, the present invention will be specifically described with reference to examples. However, the present invention should not be limited thereto.

(Measurement of Oxygen Gas Transmission and Carbon Dioxide Gas Transmission)

As a test gas, carbon dioxide/oxygen mixed standard gas from Tomoe Company Co., Ltd. was employed as a mixed gas. On the other hand, highly pure helium gas available from Tomoe Company Co., Ltd. was used as a carrier gas. As a film to be measured, a film subjected to moisture conditioning under the conditions of 23° C. and 80% RH for 2 days or more was used.

The oxygen gas transmission and the carbon dioxide gas transmission of a film in a state of a laminate were measured. By using a mixed gas transmission measuring apparatus (produced by GL Science Co., Ltd., a film double-surface moisturizing gas transmission tester), measurements were performed under the conditions of a temperature of 23° C. and a relative humidity(RH) of 80%. As the test gas, a mixed gas ($CO_2:O_2=20:80$ vol %) was used. As a transmitted gas detector, a gas chromatograph (GC-390) produced by GL Science Co., Ltd. was used and Porapak N was used as the column.

(Ratio of the Carbon Dioxide Gas Transmission to the Oxygen Gas Transmission: $\alpha=(CO_2TR/O_2TR)$)

The ratio was obtained by dividing the carbon dioxide gas transmission by the oxygen gas transmission, both of which are obtained by the aforementioned measurement method. From this ratio, selective gas permeability was evaluated.
(Viscosity of Chitosan Acid Salt Solution)

Measurement of the concentration of chitosan was performed by measuring an aqueous solution of 1 mass % or 0.5 mass % of an aqueous acetic acid salt solution of chitosan held at 20° C. by using a B type viscometer.
(Deacetylation Degree)

Chitosan was dissolved in an aqueous 0.5 mass % acetic acid solution so as to be 0.5 mass % to obtain an aqueous chitosan-acetic acid solution. Then, 1 g of the chitosan solution was taken out and 30 ml of distilled water was added to this. The obtained aqueous solution was titrated with 1/400 N potassium polyvinylsulfate using Methylene Blue as an indicator to obtain the deacetylation degree.
(Measurement of Water Vapor Transmission)

The water vapor transmission was measured as a laminate. Measurements were performed by using a water vapor transmission measuring apparatus (produced by Modern Control Co., Ltd., Permatran-W 3/31) at 40° C. Also, the laminate film was conditioned so that the side serving as a seal layer was at a relative humidity of 90% RH and the other side was at a relative humidity of 0% RH.

Example 1

Aschitosan, "Chitosan500" (tradename for a product produced by Wako Pure Chemical Industry Co., Ltd., deacetylation degree described on the label: 80 to 90 mol % or higher, viscosity: 300 to 700 cP {300 to 700 mPa·s} [a chitosan concentration of 0.5 mass % in an aqueous 0.5 mass % acetic acid solution]) was used.

Acetic acid was adjusted to 1 mass % aqueous solution by an addition of water. Then, 1 mass parts of chitosan 500 was added to 99 mass parts of the aqueous 1 mass % acetic acid solution, and the mixture was stirred for dissolution to thereby obtain a coating solution. Subsequently, the coating solution was cast on a 5-mm-thick acrylic plate, dried at 30° C. for 24 hours to evaporate water to form a film, which was peeled from the acrylic plate to obtain a 30-$\mu$m-thick film of a single layer of chitosan acetic acid salt. This film was dipped in an aqueous 1N sodium hydroxide solution at 20° C. for 120 seconds. Then, the dipped film was dipped in tap water at 20° C. for 30 minutes and then placed in a drier and dried at 90° C. for 20 minutes to evaporate water to obtain a dry film having a thickness of 40 $\mu$m. Note that the film after drying had an increased thickness as a result of shrinkage. In addition, when dipped in hot water at 80° C. for 60 minutes, the obtained film showed no change in its mass after drying. Thus, it was insoluble in water.

Examples 2 to 5

As chitosan, "Chitosan F Type" (trade name for a product produced by Kimitsu Chemical Industry Co., Ltd., deacetylation degree: 80 to 90 mol %, viscosity: 5 to 20 cP (5 to 20 mpa·s) [a chitosan concentration of 0.5 mass % in an aqueous 0.5 mass % acetic acid solution]) was used.

Acetic acid was adjusted to 7 mass % aqueous solution by an addition of water. Then, 10 mass parts of chitosan F type was added to 90 mass parts of the aqueous 7 mass % acetic acid solution, and the mixture was stirred for dissolution to thereby obtain a coating solution. The coating solution was coated on a 23-$\mu$m-thick PMP film (produced by Mitsui Chemical, Inc., $^{TR}$TPX) by use of a Mayer bar. The coated article was placed in a drier and dried at 90° C. for 20 minutes to evaporate water to obtain a laminate including a substrate of the PMP film having thereon a dry coating composed of chitosan acetic acid salt having a thickness of 3 $\mu$m. The laminate was dipped in the aqueous 1 N sodium hydroxide solution used in Example 1 for 2 seconds and then this was dipped in tap water and dried under the same conditions as in Example 1 to obtain a laminate (Example 2).

In addition, a laminate coated in the same manner as in Example 2 and having thereon a dry coating was obtained and this was dipped in the aqueous 1 N sodium hydroxide solution used in Example 1 for 15 seconds, followed by dipping in tap water and drying under the same conditions as in Example 1 to obtain a laminate (Example 3). Also, a laminate obtained by coating in the same manner as in Example 2 to have thereon a dry coating was dipped in the aqueous 1 N sodium hydroxide solution used in Example 1 for 60 seconds, followed by dipping in tap water and drying under the same conditions as in Example 1 to obtain a laminate (Example 4).

To the aqueous chitosan-acetic acid solution used in Example 2, 5 mass parts of a fatty acid ester-based surfactant "J0021of Riken Vitamin Co., Ltd." per 100 mass parts of chitosan as a solid content was added, and then the mixture was stirred for dissolution to obtain a coating solution.

The coating solution was coated in the same manner as in Example 2 to obtain a laminate having thereon a dry coating. Thereafter, this was dipped in the aqueous 1 N sodium hydroxide solution used in Example 1 for 120 seconds, and then dipped in tap water and dried under the same conditions as in Example 1 to obtain a laminate (Example 5).

The laminates thus obtained were measured of their gas transmission using a gas under the conditions of 23° C., and 80% RH (relative humidity) (Examples 1 to 5a). In Example 5, gas transmission was further measured under the conditions of 23° C. and 60% RH (Example 5b) and 23° C. and 90% RH (Example 5c).

Note that the direction of gas transmission in the tests of laminate films using carbon dioxide/oxygen mixed gas was directed from the seal layer side to the opposite side.

Coparative Example 1

A 23-$\mu$m-think PMP film (produced by Mitsui Chemical, Inc., $^{TR}$TPX) obtained by dipping the film in an aqueous 1 N sodium hydroxide solution for 120 seconds in the same manner as in Example 1 alone was measured of its gas transmission.

Results measurements of gas transmission and ratios ($CO_2TR/O_2TR$) in examples 1 to 5 and Comparative Example 1 are shown in Table 1.

TABLE 1

| | Chitosan layer ($\mu$m) | Time of dipping in alkali (second) | $CO_2TR$ ($cm^3/m^2\cdot day\cdot atm$) | $O_2TR$ | $\alpha^{*1}$ |
|---|---|---|---|---|---|
| Example 1 | 40 | 120 | 1140 | 46 | 25 |
| Comparative example 1 | 0 | 120 | 186000 | 9000 | 3 |
| Example 2 | 3 | 2 | 12800 | 450 | 28 |
| Example 3 | 3 | 15 | 12900 | 460 | 28 |
| Example 4 | 3 | 60 | 12100 | 430 | 28 |
| Example 5a | 3 | 120 | 15200 | 550 | 28 |
| 5b*² | 3 | 120 | 570 | 30 | 19 |
| 5c*³ | 3 | 120 | 32500 | 1300 | 25 |

$\alpha^{*1}$: Ratio($CO_2TR/O_2TR$) (commonly applicable to the subsequent tables)
5b*²: Gas transmission measured at relative humidity of 60%
5c*³: Gas transmission measured at relative humidity of 90%

Examples 6 to 13

As chitosan, "Chitosan 100D (VL) Type" (tradename for a product produced by Dainichi Seika Color & Chemicals Mfg. Co., Ltd., deacetylation degree: 100 mol %, viscosity: 4 to 6 cp (mPa·s) [a chitosan concentration of 0.5 mass % in an aqueous 0.5 mass % acetic acid solution]) was used.

Acetic acid was adjusted to 7 mass % aqueous solution by an addition of water. Then, 10 mass parts of chitosan 100D (VL) type were added to 90 mass parts of the aqueous 7 mass % acetic acid solution and the mixture was stirred for dissolution to thereby obtain a coating solution. The coating solution was coated on a 23-μm-thick PMP film (produced by Mitsui Chemical, Inc., $^{TR}$TPX), a 20-μm-thick stretched polyethylene film (produced by Kojin, Ltd., Kojin Polyset UM) and a 30-μm- thick polyethylene film (produced by Tohcello Co., Ltd., TUX-HC) by use of a multicoater produced by Hirano Tecseed Co., Ltd. As the method of coating, a comma direct method was used. Then, the coated articles were continuously placed in a drier and dried at 80° C. to evaporate water to obtain laminates having coated on each film substrate a 3-μm-thick dry coating composed of chitosan acetic acid salt. The line speed of the apparatus was 2 m/minute and the drying time was 60 seconds. However, in Example 11, the thickness of chitosan was 1.5 μm, and in Example 12, the thickness of chitosan was 10 μm.

Then, the dry coatings were dipped in an aqueous 1 N sodium hydroxide solution for 15 seconds and then in tap water for 30 minutes, followed by drying in a drier at 90° C. for 20 minutes to evaporate water to obtain laminates having on each film substrate a dry coating of chitosan.

On the other hand, 100 mass parts of polyester-based resin TM-590 (produced by Toyo-Morton, Ltd.), 100 mass parts of polyester-based resin CAT-8B (produced by Toyo-Morton, Ltd.), and 765 mass parts of ethyl acetate (produced by Wako Pure Chemical Industry Co. Ltd.) were mixed to prepare an adhesive, occupying in a concentration of 15 mass % of the laminate. The adhesive was coated on one side of a 30-μm-thick ethylene/vinyl acetate copolymer film (EVA: produced by Tamapoly Co., Ltd., SB-5), a 20-μm-thick stretched polyethylene film (produced by Kojin, Ltd., Kojin Polyset UM) and a 30-μm-thick polyethylene film (Tohcello Co., Ltd., TUX-HC), which form sealing layers of the respective laminate films by use of a Mayer bar. Thus, laminate films having a coating thickness of 2 μm were obtained.

The laminate films were stuck to films having coated thereon an adhesive so that the chitosan side of the former film and the adhesive side of the latter film were in contact with each other by use of a laminator under the dry conditions of 60° C. (the same conditions were applied to the sticking operation in the following Examples) to obtain laminate films of the present invention.

Examples 14 to 16

Laminate films were obtained in the same manner as in Examples 6, 7 and 8, respectively, except that the thickness of the PMP film was set to 30 μm.

Comparative Example 2

In the same manner as in Example 6, 15 mass % of an adhesive was coated on one side of a 30-μm-thick ethylene/vinyl acetate copolymer film (EVA) (produced by Tamapoly Co., Ltd., SB-5) by use of a Mayer bar to obtain a laminate having a coating thickness of 2 μm after drying. Separately, one side of the 23-μm-thick PMP film (produced by Mitsui Chemical, Inc., $^{TR}$TPX) used in Example 6 was stuck to the adhesive side of the previously obtained laminate to obtain a laminate film.

Comparative Example 3

A laminate film was obtained in the same manner as in Comparative Example 2 except that the thickness of the PMP film was set to 30 μm.

Results of measurements of gas transmission, ($CO_2TR$/$O_2TR$) and water vapor transmission in Examples 6 to 16 and Comparative Examples 2 and 3 are shown in Table 2. Note that measurements of gas transmission were performed in the direction directed from the right hand side layer to the left hand side layer shown in Table 2. (Hereinafter, there is no description in this page)

TABLE 2

| | Layer structure of laminate film Thickness of each layer (μm) | $CO_2TR$ ($cm^3/m^2$·day·atm) | $O_2TR$ ($cm^3/m^2$·day·atm) | α*1 | Water vapor transmission (g/m²·day) |
|---|---|---|---|---|---|
| Comparative example 2 | PMP/adhesive/EVA<br>23     2     30 | 26500 | 6000 | 4 | 17 |
| Comparative example 3 | PMP/adhesive/EVA<br>30     2     30 | 25400 | 5800 | 4 | 16 |
| Example 6 | PMP/chitosan/adhesive/EVA<br>23     3     2     30 | 6500 | 250 | 26 | 17 |
| Example 7 | PMP/chitosan/adhesive/stretched PE<br>23     3     2     20 | 7000 | 300 | 23 | 14 |
| Example 8 | PMP/chitosan/adhesive/PE<br>23     3     2     30 | 6900 | 350 | 20 | 10 |
| Example 9 | stretched PE/chitosan/adhesive/EVA<br>20     3     2     30 | 5500 | 250 | 22 | 10 |
| Example 10 | PE/chitosan/adhesive/EVA<br>30     3     2     30 | 4200 | 180 | 23 | 8 |
| Example 11 | PE/chitosan/adhesive/EVA<br>30     1.5     2     30 | 8100 | 450 | 18 | 8 |
| Example 12 | PE/chitosan/adhesive/EVA<br>30     10     2     30 | 2400 | 80 | 30 | 8 |
| Example 13 | PE/chitosan/adhesive/stretched PE<br>30     3     2     20 | 3300 | 120 | 28 | 7 |
| Example 14 | PMP/chitosan/adhesive/EVA<br>30     3     2     30 | 6400 | 250 | 26 | 16 |
| Example 15 | PMP/chitosan/adhesive/stretched PE<br>30     3     2     20 | 6900 | 300 | 23 | 14 |
| Example 16 | PMP/chitosan/adhesive/PE<br>30     3     2     30 | 6800 | 350 | 19 | 10 |

Examples 17 to 19

By using the laminate films obtained in Examples 6, 13 and 14, packaging tests for yam were performed. The area of packaging materials was set to 480 cm², and 200 g of yam was filled in 12 cm×20 cm bags prepared by sealing three sides of each film with the seal layer inside and vacuum-packaged. These were stored at 20° C. for 2 weeks. Every one week, the appearance of the packaging materials and the color of cut surface of yam were visually evaluated and the yam was evaluated by tasting.

Comparative Examples 4 and 5

By using a laminate film comprising a 15-μm-thick Ny (nylon) film and a 60-μm-thick PE (polyethylene) film and a film of 90-μm-thick PE, packaging tests for yam were performed. The area of the packaging materials was set to 480 cm², and 200 g of yam was filled in bags prepared in the same manner as in Example 17 and vacuum-packaged. These were stored at 20° C. for 2 weeks. Every one week, the appearance of the packaging materials and the color of cut surface of yam were visually evaluated and the yam was evaluated by tasting. Note that "good" in the evaluation of the taste means that, the taste was closer to that of the food immediately after purchase at a super market or a greengrocery in organoleptic tests. This is commonly applicable to the subsequent evaluations.

Results of the packaging tests in Examples 17, 18 and 19 and Comparative Examples 4 and 5 are shown in Table 3.

Examples 20 to 22

Packaging tests for lotus root were conducted with laminate films used in Examples 6, 13 and 14. The area of packaging materials was set to 500 cm², and 200 g of lotus root was filled in 12.5 cm×20 cm bags prepared by sealing three sides of each laminate film, with the seal layer being inside, and vacuum-packaged. These were stored at 20° C. for 2 weeks. Every one week, the appearance of the packaging materials and the color of cut surface of lotus root were visually evaluated and the lotus root was evaluated by tasting.

Comparative Examples 6 and 7

By using a laminate film composed of a 15-μm-thick Ny (nylon) film and a 60-μm-thick PE film and a 90-μm-thick PE film, bags were prepared in the same manner as in Example 20. 200 g of lotus root was filled in each bag and vacuum-packaged to thereby conduct packaging tests. The area of packaging materials was set to 500 cm².

Results of packaging tests in Examples 20 to 22 and Comparative Examples 6 and 7 are shown in Table 4.

TABLE 3

|  | Layer structure and thickness (μm) | Color*4 | Appearance of package*5 | Taste |
| --- | --- | --- | --- | --- |
| Comparative example 4 | Ny/PE = 15/60 (μm) | 0/1*6 | 2/4 | Good/Stringent |
| Comparative example 5 | PE (90 μm) | 2/3 | 0/0 | Good/Bitter |
| Example 17 | PMP/chitosan/adhesive/EVA<br>23      3        2      30 | 0/0 | 0/0 | Good/Good |
| Example 18 | PE/chitosan/adhesive/stretched PE<br>30      3        2      20 | 0/0 | 0/0 | Good/Good |
| Example 19 | PMP/chitosan/adhesive/EVA<br>30      3        2      30 | 0/0 | 0/0 | Good/Good |

/*6: The upper indicating the state after one week/the lower indicating the state after two weeks (this being commonly applicable to the subsequent tables)
Color*4: 0 = no change, 1 = weak discoloration, 2 = medium discoloration, 3 = strong discoloration (this being commonly applicable to the subsequent tables)
Appearance of package*5: 0 = vacuum, 1 = loosening, 2 = return, 3 = weak expansion, 4 = medium expansion, 5 = strong expansion (this being commonly applicable to the subsequent tables)

TABLE 4

|  | Layer structure and thickness (μm) | Color*4 | Appearance of package*5 | Taste |
| --- | --- | --- | --- | --- |
| Comparative example 6 | Ny/PE = 15/60 (μm) | 0/1*6 | 2/2.5 | Sweet/Bitter |
| Comparative example 7 | PE (90 μm) | 2/3 | 0/0 | Bitter/Sweet |
| Example 20 | PMP/chitosan/adhesive/EVA<br>23      3        2      30 | 1/0 | 0/0 | Good/Good |
| Example 21 | PE/chitosan/adhesive/stretched PE<br>30      3        2      20 | 0/0 | 0/0 | Good/Good |
| Example 22 | PMP/chitosan/adhesive/EVA<br>30      3        2      30 | 0/0 | 0/0 | Good/Good |

Examples 23 to 25

Packaging tests for Chinese cabbage kimchee (produced by Nakagawa Food Co., Ltd.) were conducted by using laminate films obtained in Examples 6, 13 and 14, respectively. The area of packaging materials was set to 300 cm². 200 g of Chinese cabbage kimchee was filled in 10 cm×15 cm bags prepared by sealing three sides of each laminate film, with the seal layer being inside, and vacuum-packaged. These were stored at 20° C. for 1 week and the appearance and the color of the packaging materials were visually evaluated.

Examples 26 and 27

A laminate having a 0.5-$\mu$m-thick chitosan dry coating obtained in the same manner as in Example 6 on one side of a 23-$\mu$m-thick PMP film (produced by Mitsui Chemical, Inc., TPX) was obtained. Furthermore, the adhesive used in Example 6 was coated on the chitosan side of the laminate into a thickness of 2 $\mu$m by a Mayer bar to obtain a laminate.

On the other hand, a PE nonwoven fabric side of a laminate film (produced by Idemitsu Petro-Chemical Co., Ltd.) comprising a PE nonwoven fabric (40 g/m²)/EVA (20 $\mu$m) and the adhesive-coated chitosan side of the laminate film were stuck to each other to obtain a laminate film. This laminate film had a $CO_2TR$ of 20,000 cm³/m²·day·atm, $\alpha$ of 10 and a water vapor transmission of 20 g/m²·day.

By using this film, a 10 cm×15 cm bag was prepared by sealing three sides of the film, with the seal layer (EVA) being inside. Packaging tests for Chinese cabbage kimchee were performed by using this bag under the same conditions as in Example 23 (Example 26).

Further, a bag was prepared from a laminate film obtained in the same manner as in Example 26 except that the thickness of the PMP film in the laminate film used in Example 26 was changed to 30 $\mu$m. By using this bag, packaging tests for Chinese cabbage kimchee were performed under the same conditions as in Example 23 (Example 27). These were stored at 20° C. for 1 week, and the appearance and the color of the packaging materials were visually evaluated.

Comparative Example 8

By using a laminate film comprising a 15-$\mu$m-thick Ny (nylon) film and a 60-$\mu$m-thick PE film, a 10 cm×15 cm bag was prepared by sealing three sides of the laminate film, with the PE layer being inside, and packaging tests for Cconditions as in Example 23. This bag was stored at 20° C. fhinese cabbage kimchee were performed under the same or 1 week and the appearance and the color of the packaging materials were visually evaluated.

Results of the packaging tests in Examples 23 to 27 and Comparative Example 8 are shown in Table 5.

TABLE 5

| | Layer structure and thickness ($\mu$m) | Color*[4] | Appearance of package*[5] | Taste |
|---|---|---|---|---|
| Comparative example 8 | Ny/PE = 15/60 ($\mu$m) | 0 | 4 | Acidity |
| Example 23 | PMP/chitosan/adhesive/EVA<br>23    3    2    30 | 0 | 0 | Good |
| Example 24 | PE/chitosan/adhesive/stretched PE<br>30    3    2    20 | 0 | 0 | Good |
| Example 25 | PMP/chitosan/adhesive/EVA<br>30    3    2    30 | 0 | 0 | Good |
| Example 26 | PMP/chitosan/adhesive/PE nonwoven fabric*[6]/EVA<br>30    0.5    2    (40 g/m²)    20 | 0 | 0 | Good |
| Example 27 | PMP/chitosan/adhesive/PE nonwoven fabric*[6]/EVA<br>30    0.5    2    (40 g/m²)    20 | 0 | 0 | Good |

For Color*[4], Appearance of package*[5] and taste, their states after 1 week were evaluated. PE nonwoven fabric*[6]: The thickness was expressed in (g/m²).

Examples 28 and 29

By using the laminate films obtained in Examples 12 and 13, 20 cm×20 cm bags were prepared by sealing three sides of each laminate film, with the seal layer inside. The area of packaging materials was set to 800 cm² and 500 g of natural shred cheese was packaged with gas exchange using a gas of $CO_2/N_2$=30/70, and packaging tests were performed. The packaged articles were stored at 15° C. for 2 months and then the appearance of thereof was visually observed.

Example 30

On one side of a 20-$\mu$m-thick oriented polypropylene (OPP) film (produced by Toray Industries, Inc., 2535), an anchoring agent (a mixed solution composed of Takelak E-550/Takenate D-140N) was coated by use of a Mayer bar to a thickness of 1 $\mu$m, and on the coated surface, a chitosan dry coating was formed into a thickness of 3 $\mu$m in the same manner as in Example 6 to obtain an OPP laminate. On the other hand, on one side of a 40-$\mu$m-thick polyethylene film (produced by Tohcello Co., Ltd., TUX-TCS), the same adhesive used in Example 6 was coated to obtain a PE film having coated thereon an adhesive having a thickness of 2 $\mu$m.

The OPP laminate film coated with chitosan and the PE film coated with an adhesive were stuck so that the chitosan side of the former film and the adhesive side of the latter film were in contact with each other to thereby obtain a laminate film. This laminate film had a $CO_2TR$ of 5,000 cm³/m²·day·atm, an $O_2TR$ of 250 cm³/m²·day·atm, $\alpha$ of 20 and a water vapor transmission of 5 g/m²·day. By using this laminate film, a bag similar to that in Example 28 was prepared, with the PE layer being inside. By using this bag, natural shred cheese was packaged through gas exchange, and packaging tests were performed in the same manner as in Example 28.

Comparative Examples 9 and 10

By using a laminate film composed of a 15-$\mu$m-thick Ny film and a 60-$\mu$m thick-PE film and a 60-$\mu$m-thick PE film alone, bags of 20 cm×20 cm were prepared by sealing three sides of the films, with the PE layer being inside in the case of the laminate film. By using the bags, packaging tests for natural shred cheese were performed. The area of the packaging materials was set to 800 cm² and 500 g of shred cheese was packaged through gas exchange, and then storage tests were performed in the same manner as in Example 28.

Results of the packaging tests in Examples 28 to 30 and Comparative Examples 9 and 10 are shown in Table 6.

TABLE 6

| | Layer structure and thickness (μm) | Color*4 | Appearance of package*5 |
|---|---|---|---|
| Comparative example 9 | Ny/PE = 15/60 (μm) | 0 | 5 |
| Comparative example 10 | PE60 (μm) | Molds occurred | 2 |
| Example 28 | PE/chitosan/adhesive/EVA<br>30    10    2    30 | 0 | 2 |
| Example 29 | PE/chitosan/adhesive/stretched PE<br>30    3    2    20 | 0 | 2 |
| Example 30 | OPP/A*6/chitosan/adhesive/PE<br>20    1    3    2    40 | 0 | 2 |

For Color*4 and Appearance of package*5, their states after 2 months were evaluated.
A*6 stands for an anchoring agent.

Example 31

By using the laminate film obtained in Example 11, packaging tests for raw bean paste were performed. As the raw bean paste, commercially available packaged raw bean paste containing no additive (Kakuma Miso Co., Ltd.) was used. The lid of the vessel, which was a cup made of polyacrylonitrile (PAN), in which 1 kg of raw bean paste was filled, was removed and a deoxidizing agent (produced by Mitsubishi Gas Chemical Company, Inc.; Ageless) was added. Then, the laminate film used in Example 11 was used as a lid to seal the vessel in a state where air was contained therein, and packaging tests were performed. The lid whose size was 11 cm×11 cm was bonded to the upper edge of the vessel with an adhesive "Araldite" produced by Nichiban Co., Ltd. The storage conditions were set to be an atmosphere of 25° C. and 65% RH for 3 months, and evaluations of the appearance and the color by visual observation were performed.

Comparative Example 11

Packaging tests for raw bean paste were performed in the same manner as in Example 31 except that a laminate film comprising a 15-μm-thick Ny film and a 60-μm-thick PE film was used as the lid.

Results of the packaging tests in Example 31 and Comparative Example 11 are shown in Table 7.

TABLE 7

| | Layer structure and thickness (μm) | Color*4 | Appearance of package*5 |
|---|---|---|---|
| Comparative example 11 | Ny/PE = 15/60 (μm) | 0 | 5 |
| Example 31 | PE/chitosan/adhesive/EVA<br>30    1.5    2    30 | 0 | 2 |

For Color*4 and Appearance of package*5 their states after 3 months were evaluated.

Examples 32 to 34

A 20 cm×30 cm bag was prepared from the laminate film obtained in Example 11 by sealing three sides thereof, with the EVA layer serving as a seal layer being inside, and peeled garlic was filled therein, and was stored at 15° C. for 2 weeks (Example 32). The area of the packaging materials was 1,200 m² and the filling amount of garlic was 1 kg. After 2 weeks' storage, neither expansion of the package nor discoloration of garlic was observed.

Further, similarly, by using 10 cm×15 cm bags prepared from the laminate film obtained in Example 11 by sealing three sides thereof, with the EVA layer serving as a seal layer being inside, nameko (Example 33) and raw green soybeans (Example 34) were vacuum-packaged and stored at 5° C. for 1 week. The area of the packaging material was 300 cm² and the filling amount was 150 g. After 1 week's storage, neither expansion of the package nor discoloration of the contents was observed.

INDUSTRIAL APPLICABILITY

According to the present invention, a film selectively permeable to carbon dioxide gas which is highly safe from the standpoint of food hygiene, is insoluble in water and has a high ratio of carbon dioxide gas transmission to oxygen gas transmission is provided from a specified chitosan. In particular, a laminate film comprising a chitosan layer sandwiched by other substrate films is suitable for packaging and storing foods which generate a large amount of carbon dioxide gas and to which oxygen is harmful in their storage, such as yam, lotus root, etc., as was apparent from the example.

What is claimed is:

1. A film selectively permeable to carbon dioxide gas comprising a laminate film comprising at least three layers composed of an outer layer, an intermediate layer and an inner layer, wherein the outer layer and the inner layer comprise a thermoplastic resin and the intermediate layer comprises a chitosan having a degree of deacetylation 70 mol % or higher and in which a ratio ($CO_2TR/O_2TR$) of carbon dioxide gas transmission ($CO_2TR$) to oxygen gas transmission ($O_2TR$) measured at a temperature of 23° C. and at a relative humidity (RH) of 80% is 15 or higher, and wherein the ratio ($CO_2TR/O_2TR$) of as the laminate film is 10 or higher.

2. A film selectively permeable to carbon dioxide gas according to claim 1, wherein intermediate layer has a thickness of 0.2 to 50 μm.

3. A food packaging film which comprises a film selectively permeable to carbon dioxide gas according to claim 1 or 2.

4. A food packaging film according to claim 3, wherein the food is coffee, cheeses, bean pastes, pickles, root crops, mushrooms, leaf-stem crops, fruit vegetables, or fruits.

* * * * *